US012370519B2

(12) United States Patent
Hofstätter et al.

(10) Patent No.: US 12,370,519 B2
(45) Date of Patent: Jul. 29, 2025

(54) REACTOR AND METHOD FOR CARRYING OUT A CHEMICAL REACTION

(71) Applicants: LINDE GMBH, Pullach (DE); BASF SE, Ludwigshafen (DE)

(72) Inventors: Martin Hofstätter, Munich (DE); Mathieu Zellhuber, Martinsried (DE); Peter Reiser, Münsing (DE); Georg Kiese, Zorneding (DE); Christian Ziegler, Munich (DE); Robert Stegemann, Munich (DE); Jens Aengenheister, Pullach (DE); Jürgen Feigl, Pullach (DE); Anton Wellenhofer, Hohenschäftlarn (DE); Clara Delhomme-Neudecker, Munich (DE); Andrey Shustov, Ludwigshafen am Rhein (DE); Eric Jenne, Hassloch (DE); Kiara Aenne Kochendörfer, Mannheim (DE); Heinrich Laib, Limburgerhof (DE); Heinz-Jürgen Kühn, Westhofen (DE); Reiner Jacob, Hochspeyer (DE)

(73) Assignee: LINDE GMBH, Pullach (DE)

( * ) Notice: Subject to any disclaimer, the term of this patent is extended or adjusted under 35 U.S.C. 154(b) by 353 days.

(21) Appl. No.: 17/996,523

(22) PCT Filed: Apr. 22, 2021

(86) PCT No.: PCT/EP2021/060601
§ 371 (c)(1),
(2) Date: Oct. 19, 2022

(87) PCT Pub. No.: WO2021/214257
PCT Pub. Date: Oct. 28, 2021

(65) Prior Publication Data
US 2023/0211305 A1 Jul. 6, 2023

(30) Foreign Application Priority Data

Apr. 23, 2020 (EP) .................................... 20171196

(51) Int. Cl.
*B01J 19/00* (2006.01)
*B01J 8/06* (2006.01)
(Continued)

(52) U.S. Cl.
CPC .............. *B01J 19/002* (2013.01); *B01J 8/067* (2013.01); *B01J 19/087* (2013.01);
(Continued)

(58) Field of Classification Search
CPC ........ B01J 8/067; B01J 8/062; B01J 19/2425; B01J 19/002; B01J 19/087;
(Continued)

(56) References Cited

U.S. PATENT DOCUMENTS

2021/0179948 A1\* 6/2021 Kochendoerfer .... H05B 1/0244

FOREIGN PATENT DOCUMENTS

DE 102015004121 A1 10/2016
EP 1043367 A1 10/2000
(Continued)

OTHER PUBLICATIONS

International Search Report of related App. No. PCT/EP2021/060601, dated Aug. 4, 2021.
(Continued)

*Primary Examiner* — Lessanework Seifu
(74) *Attorney, Agent, or Firm* — AVEK IP, LLC

(57) ABSTRACT

A reactor for carrying out a chemical reaction has a reactor vessel, one or more reaction tubes and means for the electrical heating of the one or more reaction tubes. The reactor vessel has one or more discharge orifices which are permanently open or are set up to open above a preset pressure level, and gas feed means are provided, which are set up to feed an inerting gas into an interior of the reactor vessel.

20 Claims, 9 Drawing Sheets

(51) Int. Cl.
   *B01J 19/08*   (2006.01)
   *B01J 19/24*   (2006.01)
(52) U.S. Cl.
   CPC .............. *B01J 19/2425* (2013.01); *B01J 2208/00628* (2013.01); *B01J 2219/00245* (2013.01)
(58) Field of Classification Search
   CPC ........ B01J 2208/00628; B01J 2208/065; B01J 2208/00389; B01J 2219/0803
   See application file for complete search history.

(56) References Cited

FOREIGN PATENT DOCUMENTS

| | | |
|---|---|---|
| JP | S49010026 A | 1/1974 |
| JP | S5223246 A | 2/1977 |
| JP | H06104187 A | 4/1994 |
| JP | H1053775 A | 2/1998 |
| JP | H1094727 A | 4/1998 |
| JP | 2006261362 A | 9/2006 |
| JP | 2009526734 A | 7/2009 |
| JP | 2011258392 A | 12/2011 |
| JP | 2013067537 A | 4/2013 |
| PL | 175410 B1 | 5/1995 |
| RU | 2173213 C1 | 9/2001 |
| WO | 2004091773 A1 | 10/2004 |
| WO | 2015197181 A1 | 12/2015 |
| WO | 2017072057 A1 | 5/2017 |
| WO | 2019228798 A1 | 12/2019 |
| WO | 2020002326 A1 | 1/2020 |

OTHER PUBLICATIONS

Notice of Opposition received in related Application No. EP21719925.6, dated Jul. 25, 2024.
Waitz and Wubben "Resistance heated furnaces for protective gas and vacuum operation" from Heat Processing (9), Issue 1, 2011, p. 29-38.

* cited by examiner

REACTOR AND METHOD FOR CARRYING OUT A CHEMICAL REACTION

CROSS-REFERENCE TO RELATED APPLICATIONS

This application is the national phase of, and claims priority to, International Application No. PCT/EP2021/060601, filed Apr. 22, 2021, which claims priority to European Application No. 20171196.7, filed Apr. 23, 2020, the disclosure of each of which is incorporated by reference herein in its entirety.

FIELD OF THE INVENTION

The invention relates to a reactor and a method for carrying out a chemical reaction according to the preambles of the independent claims.

BACKGROUND

In a number of processes in the chemical industry, reactors are used in which one or more reactants are passed through heated reaction tubes and catalytically or non-catalytically reacted there. The heating serves in particular to overcome the activation energy required for the chemical reaction that is taking place. The reaction can proceed as a whole endothermically or, after overcoming the activation energy, exothermically. The invention relates in particular to strongly endothermic reactions.

Examples of such processes are steam cracking, various reforming processes, in particular steam reforming, dry reforming (carbon dioxide reforming), mixed reforming processes, processes for dehydrogenating alkanes, and the like. In steam cracking, the reaction tubes are guided through the reactor in the form of coils, which have at least one U-bend in the reactor, whereas tubes running through the reactor without a U-bend are typically used in steam reforming.

The invention is suitable for all such processes and designs of reaction tubes. The articles "Ethylene," "Gas production," and "Propene" in Ullmann's Encyclopedia of Industrial Chemistry, for example the publications dated Apr. 15, 2009, DOI: 10.1002/14356007.a10_045.pub2, dated Dec. 15, 2006, DOI: 10.1002/14356007.a12_169.pub2, and dated Jun. 15, 2000, DOI: 10.1002/14356007.a22_211, are referred to here for purely illustrative purposes.

The reaction tubes of corresponding reactors are conventionally heated using burners. In this case, the reaction tubes are routed through a combustion chamber in which the burners are also arranged.

However, as described, for example, in DE 10 2015 004 121 A1 (likewise EP 3 075 704 A1), the demand for synthesis gas and hydrogen which are produced with or without reduced local carbon dioxide emissions is, for example, currently increasing. However, this demand cannot be met by processes in which fired reactors are used due to the combustion of typically fossil energy carriers. Other processes are ruled out, for example, due to high costs. The same applies to the provision of olefins and/or other hydrocarbons by steam cracking or dehydrogenation of alkanes. In such cases as well, there is a desire for methods that emit lower amounts of carbon dioxide on site.

Against this background, the aforementioned DE 10 2015 004 121 A1 proposes an electrical heating of a reactor for steam reforming in addition to a firing. In this case, one or more voltage sources that provide a three-phase alternating voltage on three external conductors are, for example, used. Each external conductor is connected to a reaction tube. A star circuit is formed in which a star point is realized by a collector into which the pipelines open and to which the reaction tubes are conductively connected. In this way, the collector ideally remains potential-free. In relation to the vertical, the collector is arranged below and outside the combustion chamber and preferably extends transversely to the reactor tubes or along the horizontal. WO 2015/197181 A1 likewise discloses a reactor whose reaction tubes are arranged in a star-point circuit.

In addition to the direct heating of reaction tubes, with which an electrical current flows through the reaction tubes, there is also a wide variety of concepts for the indirect electrical heating of reaction tubes. Indirect electrical heating can take place, as described inter alia in WO 2020/002326 A1, in the form of external electrical heating. Internal heating is also possible, as disclosed in WO 2019/228798 A1, for example. In addition to resistance or impedance heating, inductive electrical heating of reaction tubes or of a catalyst bed, as described in WO 2017/072057 A1, can take place. Inductive heating can, for example, heat an internal or external heating element or the reaction tubes themselves. Direct (non-inductive) heating of a reaction tube is also disclosed in DE 10 2015 004 121 A1. For heating, basic concepts with polyphase or single-phase alternating current or with direct current can be realized. In the case of direct heating of reactors by means of direct current or also with single-phase alternating current, no star circuit with a potential-free star point can be realized, but the power input can in principle be realized in a similar manner as in the case of a polyphase direct current. The invention is suitable for all variants of electrical heating.

WO 2004/091773 A1 describes an electrically heated reactor for carrying out gas reactions at high temperature. The reactor consists of a reactor block, of one or more monolithic modules of a material suitable for electrical heating, which modules are surrounded by a housing, of channels that extend through the module(s) and are designed as reaction channels, and of a device for conducting or inducing a current in the reactor block. The safety during operation of such a reactor is to be increased in that the housing of the reactor block has a double-walled jacket, which seals said reactor block in a gas-tight manner, and at least one device for feeding an inerting gas into the double-walled jacket.

As also explained below, special safety-relevant aspects must be observed in the case of electrically heated reactors. An object of the invention is to specify measures that take these aspects into account and in this way allow advantageous operation of an electrically heated reactor.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a reactor for carrying out a chemical reaction includes a reactor vessel; one or more reaction tubes; and means for the electrical heating of the one or more reaction tubes. The reaction tubes are guided through the reactor with at least one U-bend or run through it without U-bends. The reactor vessel has one or more discharge orifices that are permanently open or are set up to open above a preset pressure level. Gas feed means are provided and configured to feed an inerting gas into the reactor vessel. Means are provided and configured to prevent reaction operation if an oxygen content and/or pressure and/or hydrocarbon content measured in the reactor vessel and/or in a discharge line downstream of the reactor vessel exceeds a respective preset value.

According to another embodiment, a method for carrying out a chemical reaction includes providing a reactor and operating the reactor to carry out a chemical reaction. The reactor includes a reactor vessel; one or more reaction tubes; and means for the electrical heating of the one or more reaction tubes. The reaction tubes are guided through the reactor with at least one U-bend or run through it without U-bends. The reactor vessel has one or more discharge orifices which are permanently open or are set up to open above a preset pressure level. An inerting gas is fed into the reactor vessel by a gas feed means. Means are also provided, and configured to prevent reaction operation if an oxygen content and/or a pressure and/or a hydrocarbon content measured in the reactor vessel and/or in a discharge line downstream of the reactor vessel exceeds a respective preset value.

WRITTEN DESCRIPTION

Figure 1:
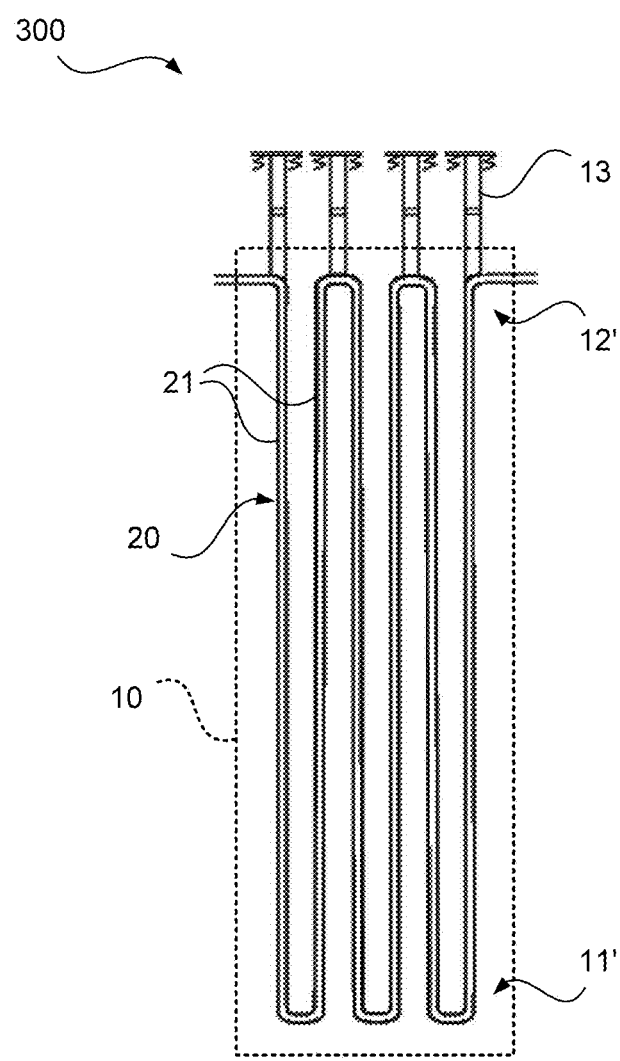
FIG. 1 schematically illustrates a reactor for carrying out a chemical reaction according to a non-inventive development.

Against this background, the invention proposes a reactor and a method for carrying out a chemical reaction according to the preambles of the independent claims. Embodiments are the subject matter of the dependent claims and the following description.

In an electrified furnace concept (the term "furnace" is commonly understood to denote a corresponding reactor or at least its thermally insulated reaction space) that is the basis of the invention, reaction tubes, for example, or corresponding tube sections thereof (hereinafter also referred to for short as "tubes") are themselves used as electrical resistors in order to generate heat. This direct approach has the advantage of a greater efficiency compared to indirect heating by external electric heating elements along with a higher attainable heat flux density. However, as mentioned above, it is also possible to carry out any other type of electrical heating (directly or indirectly, as resistance, impedance, or induction heating, by means of a single-phase or polyphase alternating current or with direct current) within the framework of the invention if said heating proves to be advantageous.

In the case of heating with polyphase alternating current, the power can be fed into the directly heated reaction tubes via M separately connected phases. The current-conducting reaction tubes connected to the M phases may also be electrically connected to a star point at the other end. The number of phases M is in particular 3, corresponding to the number of phases of conventional three-phase current sources or networks. In principle, however, the invention is not restricted to the use of three phases but can also be used with a larger number of phases, e.g., a number of phases of 4, 5, 6, 7, or 8. Thereby, a phase offset amounts to in particular 360°/M, i.e., 120° for a three-phase current.

In electrical heating with polyphase alternating current, potential equalization between the phases is achieved at the star point by the star circuit, which ideally makes electrical insulation of the connected pipelines superfluous. This represents a particular advantage of such a furnace concept, since a break in the metallic reaction tubes for insulating certain sections is undesirable, in particular because of the high temperatures used and the high material and construction outlay thus required.

However, the measures proposed according to the invention and explained below are suitable in the same way for the use of single-phase alternating current and direct current, and the invention can be used both in reactors heated with alternating current and in reactors heated with direct current or also in corresponding mixed forms. As mentioned, the invention is also suitable for use in indirectly heated reaction tubes. In the case of a direct current arrangement, only the type of the current source and the region of the reaction tubes opposite to the power input or corresponding sections supplied with current are, for example, different from an alternating current arrangement. In the latter, an electrical connection of different tube sections is only optionally carried out. Since a potential-free star point is not present in a direct current arrangement, suitable current discharge elements are to be provided, which safely conduct the current flow back to the outside. The latter can be designed analogously to the power inputs described below.

The invention relates to the protection of electrically heated reactors of the type explained, which is necessary in particular in the case of damage to the reaction tubes ("coil shredder"). In the case of corresponding damage, one or more reaction tubes can, in particular, be severed completely; however, the invention is also advantageous for leakages to a lesser extent. In the case of corresponding damage, a sudden or creeping escape of combustible gas into the reactor vessel largely sealed for reasons of thermal insulation occurs.

Such damage is a lower safety-related problem in conventional, fired reactors than in purely electrically heated reactors, as are used in particular according to the invention, since combustible gases emerging from the reaction tubes in fired reactors, for example in the form of a hydrocarbon-steam mixture, can be reacted immediately and continuously through the combustion taking place in the reactor vessel or a corresponding combustion chamber, or since a significantly reduced oxygen content is present due to the combustion taking place and the gas space surrounding the reaction tubes is thus already substantially "inertized." In contrast, in the case of purely electrical heating, corresponding combustible gases could accumulate in the reactor vessel and there, at the normal oxygen content of the air and temperatures above the spontaneous ignition temperature, reach the explosion or detonation limit, for example. In the case of combustion without explosion or detonation as well, a complete or incomplete combustion results in an energy input and thus possibly overheating. Together with the gas volume flowing out of the reaction tubes, the complete or incomplete combustion can per se in particular lead to a significant pressure increase. The invention reduces such a pressure increase because combustion of the gas mixture is prevented.

In the terminology of the claims, the invention relates to a reactor for carrying out a chemical reaction, which has a reactor vessel (i.e., a thermally insulated or at least partially insulated region), one or more reaction tubes and means for the electrical heating of the one or more reaction tube(s). The reactor proposed according to the invention is in particular set up to carry out a chemical reaction at a temperature level explained below for high-temperature reactions. The reaction tubes are guided through the reactor with at least one U-bend or run through the reactor without any U-bends. The means for electrical heating can be designed as explained extensively above. On the one hand, the means may be means for feeding power into the one or more reaction tubes, which means bring about a flow of current in the one or more reaction tubes and a corresponding heating, for example rigid current rods guided into the reactor, but the means may also be means for indirect heating, such as resistance and/or inductive heating devices, which transfer heat conductively and/or by thermal radiation onto the one or more reaction tubes, or which generate eddy currents, for example, in the one or more reaction tubes or a catalyst bed and in this way bring about heating.

Within the framework of the invention, the reactor vessel has one or more discharge orifices, which are permanently open or are set up to open above a preset pressure level, and gas feed means are provided, which are set up to feed an inerting gas into an interior of the reactor vessel.

Below, a reactor is predominantly described that is designed according to the invention or according to different embodiments of the invention. The corresponding explanations also apply in each case to a corresponding method, with which the correspondingly set up means carry out the specified method steps in each case.

For feeding the inerting gas, the gas feed means comprise, for example, feed nozzles or openings that open into the reactor vessel, along with lines and a gas reservoir connected thereto, whereby the inerting gas can be supplied to the interior of the reactor vessel. The reactor vessel is in particular a chamber that is predominantly, i.e., at least to 90, 95 or 99%, surrounded by a thermally insulating wall. The interior of the reactor vessel is the region in which the reaction tubes are arranged and which is surrounded by the reactor wall. A reactor wall that, for example, can also be of double-walled design is not part of the interior.

In all embodiments of the invention, the inerting gas can be a gas or a gas mixture that has nitrogen, carbon dioxide and/or argon in a respectively superatmospheric content, or the gas feed means are set up to provide a corresponding inerting gas, for example by holding the corresponding inerting gas available or by providing it by mixing pure gases or admixing pure gases to air. In particular, the content of a non-combustible gas can be more than 50%, 60%, 70%, 80% or 90%. An inerting gas, therefore, does not have to be a pure "inert gas" in the traditional sense; rather, it is sufficient if the inerting gas, in particular due to its content of a non-combustible gas, at least partially reduces the flammable range of the mixture, i.e., reduces the risk of ignition, explosion or detonation. An inerting gas for use within the framework of the invention can in particular have a subatmospheric oxygen content, for example an oxygen content of less than 10%, 5%, 1%, 0.5%, or 0.1%. An inerting gas can in particular also be (completely or substantially) oxygen-free.

By means of the proposed measures, the invention provides a containment with a conditioned atmosphere, which containment serves for the thermal insulation and for the safety-related protection of high-temperature reactors, with which the energy input takes place electrically. Within the framework of the invention, a completely electrical heating can in particular be provided, i.e., the heating of the reaction tubes takes place, at least within the reactor vessel, advantageously predominantly or exclusively by thermal heating, i.e., at least 90, 95, or 99% of the amount of heat introduced here, in particular of the entire amount of heat introduced here, takes place by electrical heating means. A heat input via a gas mixture conducted through the one or more reaction tubes remains disregarded here, so that this proportion relates in particular to the heat transferred from the outside to the wall of the one or more reaction tubes within the reactor vessel or generated within the reactor vessel in the wall or a catalyst bed.

In its most general form, the invention thus describes a containment for high-temperature reactors supplied with hydrocarbons (wherein the term "high-temperature reaction" here refers in particular to a reaction that proceeds at a temperature of more than 500° C. and in particular of 700 to 1000° C.) with electrical heating, which containment 1) provides an inerted atmosphere in the surroundings of the tubes, and 2) is not permanently tightly closed. The application for electrically heated reactors with which the process gas temperature is close to or above the spontaneous ignition temperature of the hydrocarbons contained in the process gas is particularly preferred. The term "process gas" refers to a gas or gas mixture flowing through the one or more reaction tubes.

Embodiments of the invention differ in particular by the embodiment of the one or more discharge orifices, which are permanently open or are set up to open above a preset pressure level. However, a combination of correspondingly designed discharge orifices is also possible in principle.

In a group of embodiments referred to below as the "first group," the one or more discharge orifices are permanently open. This means that the one or more discharge orifices do not offer any mechanical resistance against the flow of fluid into or out of the reactor vessel except for the possibly existing narrowing of the flow cross-section. The one or more openings are therefore not closed.

In contrast, in a group of embodiments referred to below as the "second group," the one or more discharge orifices are set up to open above the predetermined pressure level. The one or more discharge orifices are closed below the preset pressure level or are set up to open temporarily or permanently when the preset pressure level is reached. In this respect, the term "permanently" open refers in particular to an irreversible opening, so that after subsequent undershooting of the preset pressure level, no re-closure by discharging gas takes place in this embodiment. In contrast, the term "temporarily" open refers to an opening where re-closure does take place.

For opening at the preset pressure level, the one or more discharge orifices may have, for example, one or more spring-loaded or weight-loaded flaps, which have an opening resistance defined by the spring or load characteristic values and therefore open only from a corresponding pressure. In one embodiment of the second group of embodiments, one or more bursting disks or pressure relief valves may also be used in a manner known per se. It is also possible to detect a pressure value, for example by means of sensors, and to trigger an opening mechanism of any type, for example an ignition mechanism or an electrically actuated drive, when a preset threshold value is exceeded. This makes it possible to release a sufficiently large cross-section, which is kept closed in the explained manner during normal operation, within a short response time when necessary.

In particular in the first group of embodiments, but possibly also in the second group of embodiments, the reactor can be set up for constant purging with inert gas. In other words, the gas feed means explained are set up to continuously feed the inerting gas into the reactor vessel. In the first group of embodiments, the inerting gas can flow out in particular predominantly through the one or more permanently open discharge orifices, but optionally also through further discharge orifices, in particular unavoidable or deliberately created gas leaks or bypasses, for example to an existing chimney. In the second group of embodiments in which the one or more permanently open discharge orifices are normally closed, further openings for the outflow of the inerting gas are either provided, for example bypass lines to a chimney, or inevitably present, for example due to leaks of the reactor vessel.

Alternatively to the constant purging, it may however also be provided to supply the inerting gas only once or periodically to the reactor in accordance with one or more predetermined criteria. The gas feed means are then set up for such an operation. One or more predetermined criteria can include, for example, reaching a preset pressure value and/or a preset concentration, for example a minimum and tolerable oxygen content. However, one criterion may also be that the reactor vessel is put into operation for the first time. In particular, a continuous measurement can be carried out and the feeding of inerting gas can be initiated whenever corresponding measured values indicate that the preset criteria are no longer fulfilled. The one-time or periodic supply of inerting gas can be provided, in particular in the second group of embodiments, below the pressure value for the opening of the one or more discharge orifices since free escape of the inerting gas can be prevented here and the inerting gas can be held in the reactor vessel for longer periods of time.

In a particularly preferred embodiment of the first group of embodiments, the reactor is set up for operation of the reactor vessel at a subatmospheric pressure level. In this case, means for forming a gas flow out of the reactor are provided. In this connection, the one or more discharge orifices, which, in this group of embodiments, are permanently open after all, can be connected permanently open to a chimney that has a chimney mouth at a sufficient height. This results in a static negative pressure in the reactor vessel due to the high temperatures in the reactor vessel and the resulting lower density of the gas volume contained. In this connection, it is also possible to provide the use of blowers, for example, up to the formation of a corresponding static negative pressure.

In contrast, in a particularly preferred embodiment of the second group of embodiments, the reactor is set up for operation of the reactor vessel at a superatmospheric pressure level. This can be achieved in particular by feeding the inerting gas up to a superatmospheric pressure level, which is below an opening pressure of the discharge orifices.

The system according to the first group of embodiments, which has been inertized up to a certain degree and is "open" to the environment (in particular with a slight negative pressure in the reactor vessel as a result of the chimney effect) or else the "openable" system according to the second group of embodiments of the invention (which can be operated in particular with a certain overpressure in the reactor vessel) can limit the pressure increase rate, in the case of an escape of hydrocarbons damage to the reaction tubes, to a tolerable amount that satisfies the design limits of the reactor vessel.

The oxygen content present there can be reduced as a result of the concept of a reactor vessel supplied with inerting gas. The reaction rate of the hydrocarbons escaping in the event of damage and thus the significant additional volume increase (as a result of the reaction heat input) scales in a first approximation with the oxygen partial pressure or the molar oxygen content in the box.

In both groups of embodiments of the invention, as a result of the feeding of the inerting gas, the walls of the reactor vessels advantageously do not have to be designed to be completely gas-tight, which could only be carried out with very high material outlay, for example the use of temperature-resistant bellows structures and the like, due to the high temperatures at certain locations due to a required possibility of movement. In the case of operation at the subatmospheric pressure level in conjunction with a chimney, although air can possibly be drawn into the reactor vessel via corresponding leaks, this air is discharged and diluted accordingly by the continuous flow brought about by the chimney. Safety problems in the use of inerting gases that potentially impair breathing or of components thereof can be prevented in this way. In contrast, in the case of operation at a superatmospheric pressure level, an inflow of air into the reactor vessel can be reliably prevented due to the uniform pressure propagation. Inerting gas escaping via leaks can be discharged or diluted, for example, by sufficient ventilation outside the reactor vessel.

As a result of the proposed concept of the reactor vessel supplied with inerting gas, the oxygen content can be reduced here. As can be utilized according to the invention, the reaction rate of the escaping hydrocarbons and thus the significant additional volume increase rate (as a consequence of the reaction heat input) correlates in a first approximation with the oxygen partial pressure or the oxygen mole fraction. This correlation is summarized in Table 1 below, wherein $xO_2$ denotes the molar oxygen content and $V_{reak}$ the reaction-related volume increase rate.

The gas feed means are therefore advantageously set up to adjust a maximum oxygen content in the reaction vessel on the basis of a dimensioning of the chimney or the chimneys.

TABLE 1

| $xO_2$ [vol. %] | $V_{reak}$ [m³/s] |
| --- | --- |
| 21 | 218 |
| 15 | 156 |
| 10 | 104 |
| 5 | 52 |
| 3 | 31 |
| 1 | 10 |
| 0.1 (almost inert) | 1 |

The maximum permissible pressure $p_{max}$ follows from the mechanical stability of the respective chambers or a surrounding containment. This pressure must be at least as large as the pressure $p_{box}$ in the case of a coil shredder or in the case of a corresponding other safety-relevant event, which in turn depends on the volume $V_{Box}$ of the relevant chambers, on the chimney diameter $D_{Chimney}$ and the molar oxygen content:

$$p_{max} \geq p_{box} = f(V_{BOX}, D_{Chimney}, xO_2)$$

This requirement results in a design basis for the dimensioning of the chimney, that is to say the connection to the environment, which is permanently or temporarily present via the one or more discharge orifices, and vice versa. This relationship is now explained once again with reference to FIG. 9. If, for example, a maximum permissible pressure increase of 20 mbar is used as a basis here, as illustrated by the dashed lines 601 and 602, in order to be able to use a chimney with a diameter of 500 mm (dashed line 601), a reaction-related volume increase rate of at most approximately 10 m$^3$/s may result, which leads to a maximum oxygen content of approximately 1%, which is adjusted by the inertization.

Conversely, if an inertization to an oxygen content of at most 1% is to be carried out, a chimney diameter of at least 500 mm must thus be used. In order to be able to use a chimney with a diameter of 900 mm (dashed line 602), only a volume increase rate of approximately 42 m$^3$/s may result, which leads to a maximum oxygen content of approximately 4%, which is adjusted by the inertization. Conversely, and analogously to the explanations above, if an inertization to an oxygen content of at most 4% is to take place, a chimney diameter of at least 900 mm must be used here.

The smaller the oxygen content in the reactor vessel, the smaller is the volume increase. Consequently, the diameter of the emergency chimney that must discharge the additional volume can also be smaller. Important for an efficient limitation of the oxygen content is always sufficiently good sealing with respect to the environment, in order to prevent the entry of oxygen-containing false air as far as possible or in a sufficient manner. As explained, however, complete sealing is not required.

In other words, within the framework of the invention, a maximum oxygen content in the reaction vessel is thus adjusted by means of the inerting gas, which maximum oxygen content is selected in the first group of embodiments in the presence of a chimney on the basis of a dimensioning of the chimney or the chimneys, or the gas feed means are set up for feeding inerting gas or for adjusting the oxygen content on this basis. The gas feed means can also be set up in particular to feed in such a way that a target pressure is not exceeded. In the second group of embodiments, it is likewise possible for feeding to take place on the basis of an oxygen concentration or a target pressure and chimney dimensioning.

An amount of the inerting gas fed in can be regulated by corresponding regulating means, in particular on the basis of an oxygen measurement in the reactor vessel or in the chimney, if present, as a result of which the oxygen content can be kept constant during operation. A corresponding safety concept comprises according to the invention that operation of the reactor is or continues to be prevented when the measured oxygen content exceeds a target oxygen content. For example, a feeding of hydrocarbons into the reaction tubes and/or the heating thereof can be released only when a required oxygen content is undershot. When a fault is detected, reaction operation with hydrocarbon addition into the reaction tubes can be prevented in general.

An impermissible escape of gas from the reaction tubes can be detected, for example, via pressure measuring sensors, wherein a feeding of hydrocarbons into the reaction tubes can be prevented when gas escape is detected in order to minimize the total amount of escaping hydrocarbons.

For detecting very small damage (leakage flow without drastic pressure increase), the hydrocarbon content in the reactor vessel or the chimney, if present (for example in the form of a carbon monoxide equivalent), can also be measured continuously. An impermissible value can likewise result in the prevention of the hydrocarbon feed.

The invention therefore encompasses, more generally speaking, that a value that characterizes a gas escape from the one or more reaction tubes is determined on the basis of a pressure and/or hydrocarbon measurement, and that one or more safety measures are initiated if the value exceeds a preset threshold value.

With the method proposed according to the invention for carrying out a chemical reaction, a reactor is used which has a reactor vessel, one or more reaction tubes, and means for the electrical heating of the one or more reaction tubes. According to the invention, the reactor vessel used is a reactor vessel that has one or more discharge orifices, which are permanently open or are set up to open above a preset pressure level, and an inerting gas is fed according to the invention into an interior of the reactor vessel by using gas feed means.

For further features and advantages of a corresponding method, in which a reactor according to one of the previously explained developments of the invention is advantageously used, reference is made to the above explanations.

The invention will be further elucidated below with reference to the accompanying drawings, which illustrate developments of the invention with reference to and in comparison with the prior art.

In the figures, elements that correspond to one another functionally or structurally are indicated by identical reference symbols and for the sake of clarity are not repeatedly explained. If components of devices are explained below, the corresponding explanations will in each case also relate to the methods carried out therewith and vice versa. The description of the figures repeatedly refers to alternating current heating. As mentioned, however, the invention is also suitable in the same way for the use of direct current for heating. Reference is made here to the above explanations.

FIG. 1 schematically illustrates a reactor for carrying out a chemical reaction according to a non-inventive development.

Figure 2:
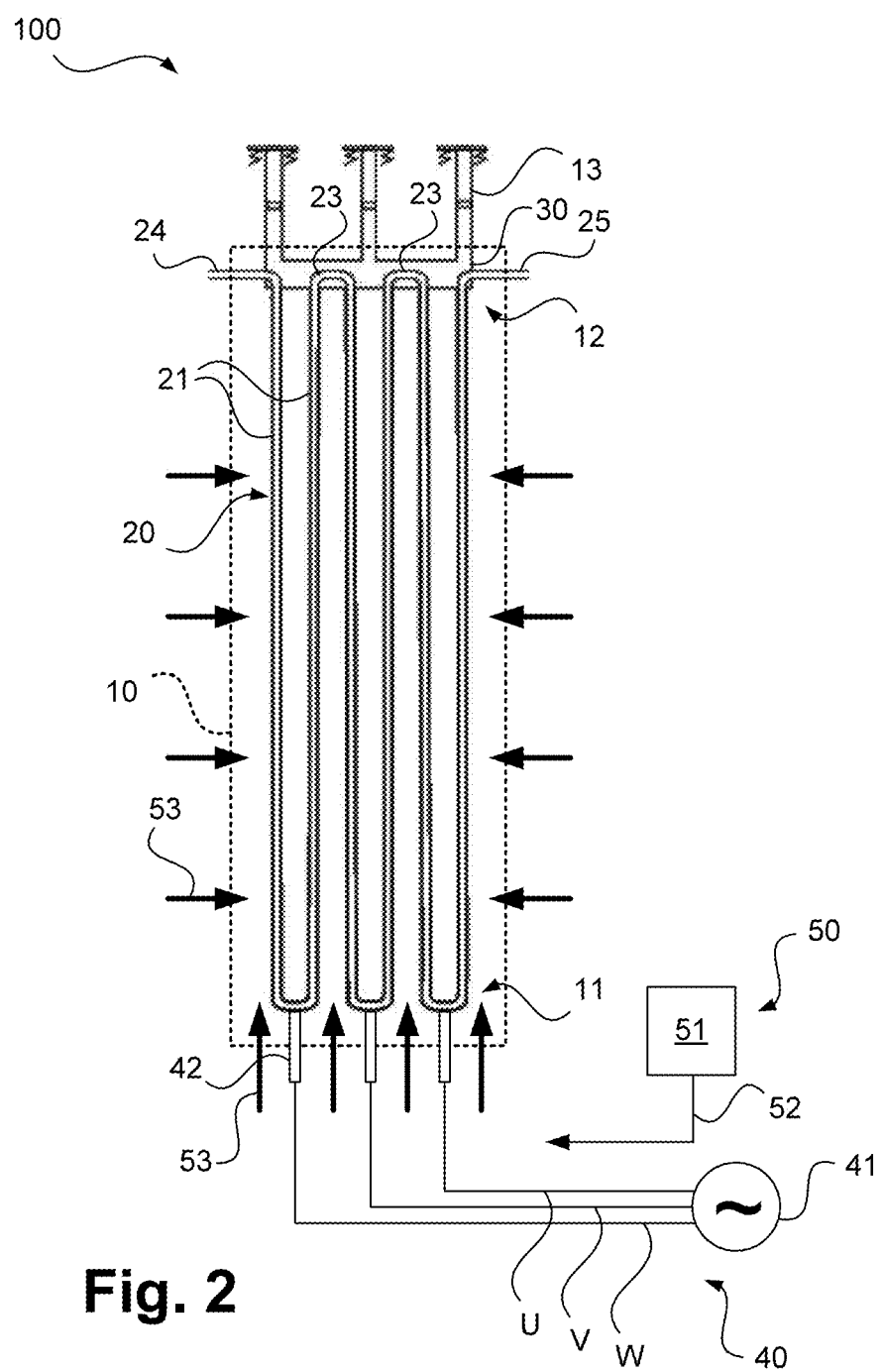
FIGS. 2 to 8 schematically illustrate reactors for carrying out a chemical reaction according to an embodiment of the invention.

The reactor here designated 300 is set up to carry out a chemical reaction. For this purpose, it has in particular a thermally insulated reactor vessel 10 and a reaction tube 20, wherein a number of tube sections of the reaction tube 20, which are designated here by 21 only in two cases, run respectively between a first zone 11' and a second zone 12' in the reactor vessel 10. The reaction tube 20, which will be explained in more detail below with reference to FIG. 2, is attached to a ceiling of the reactor vessel or to a support structure by means of suitable suspensions 13. In a lower region, the reactor vessel can in particular have a furnace (not illustrated). It goes without saying that a plurality of reaction tubes can be provided in each case here and subsequently.

FIG. 2 schematically illustrates a reactor, which is overall denoted by 100, for carrying out a chemical reaction according to an embodiment of the invention.

The zones previously denoted by 11' and 12' here take the form of regions 11 and 12, wherein the tube sections 21 for heating the tube sections 21 in the first regions 11 can in each case be electrically connected to the phase connections U, V, W of a polyphase alternating current source 41 via connection elements 42, as a result of which means denoted as a whole by 40 for electrically heating the reaction tube 20 are formed. Switches and the like as well as the specific type of connection are not illustrated. In the embodiment of the invention illustrated here, the tube sections 21 are electrically conductively connected to one another in the second regions 12 by means of a connecting element 30, which is integrally connected to the one or more reaction tubes 20 and is arranged within the reactor vessel 10. A neutral conductor can also be connected to the connecting element 30.

In the example illustrated here, a star circuit of a plurality of alternating current phases is thus realized. As mentioned several times, the invention can however also be provided using single-phase alternating current heating, direct current heating, or other means for heating, for example for inductive or indirect heating in the sense explained above.

In the reactor 100 illustrated here, a plurality of tube sections 21 of one reaction tube 20 (although a plurality of such reaction tubes 20 may be provided) are thus arranged side by side in the reactor vessel 10. The tube sections 21 pass into one another via U-bends 23 (only partially denoted) and are connected to a feed section 24 and an extraction section 25.

A first group of the U-bends 23 (at the bottom in the drawing) is arranged side by side in the first region 11 and a second group of the U-bends 23 (at the top in the drawing) is arranged side by side in the second region 12. The U-bends 23 of the second group are formed in the connecting element 30, and the tube sections 21 extend from the connecting element 30 in the second region 12 to the first region 11. The power input elements 52 may be designed as desired, for example rigid, and, with rod-shaped sections, can pass through a wall of the reactor vessel 10.

Means for feeding an inerting gas into the reactor vessel are denoted as a whole by 50. As illustrated by arrows 53 (only partially denoted accordingly), the inerting gas is fed into the reactor vessel 10 in particular via wall openings, nozzles, or the like in one or more walls of the reactor vessel 10. In order to provide and feed the inerting gas, suitable gas feed means are provided, which are also illustrated here in a highly simplified manner, and which comprise, for example, one or more gas tanks 51 and corresponding lines 52.

Figure 3:
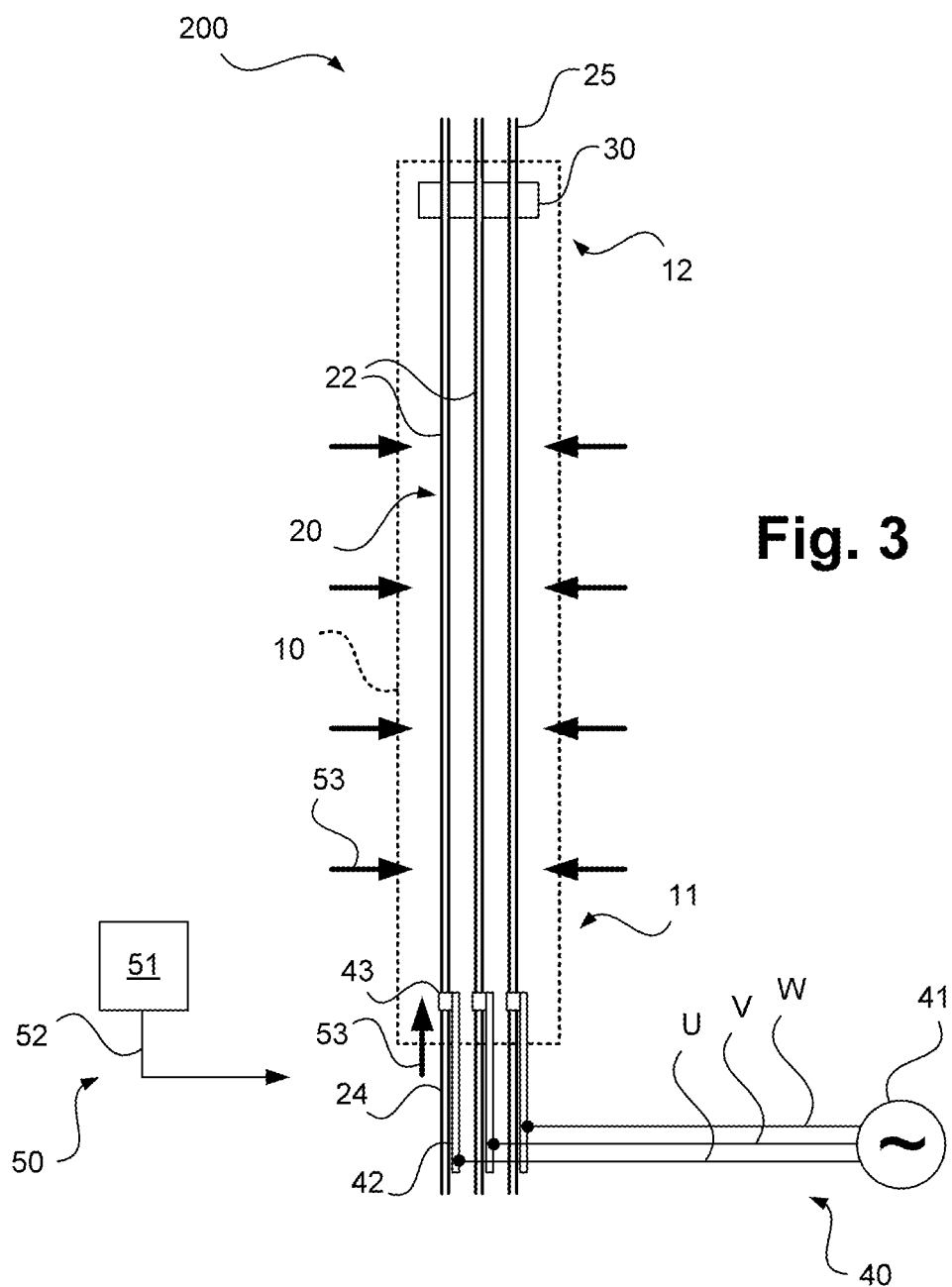

FIG. 3 schematically illustrates a reactor, which is overall denoted by 200, for carrying out a chemical reaction according to a development of the invention.

In the reactor 200, the tube sections—here in contrast denoted by 22—in each case comprise a tube section 22 consisting of a plurality of reaction tubes 20, wherein the tube sections 22 are arranged side by side in the reactor vessel 10 in a fluidically unconnected manner and are in each case connected to feed sections 24 and extraction sections 25. For the remaining elements, reference is expressly made to the above explanations relating to the preceding figures.

In turn, the use of a connecting element 30 within the framework of the invention is optional, albeit advantageous in particular when using a polyphase alternating current heater. Here as well, power input elements 42 are illustrated in a highly simplified manner. The feeding of the inerting gas according to the arrows 53 takes place here as substantially explained above. The power input elements 42 can have a sleeve-like region 43, which is attached thereto and placed in the first region 11 around the reaction tubes 20 or the tube sections.

FIGS. 4 to 8 show partial views of reactors according to embodiments of the invention in a further simplified illustration, wherein a chimney 60 is also illustrated in each case. The gas feed means 50 for feeding the inerting gas are not shown, nor are the means 40 for electrical heating. The reaction tube 20 is illustrated with U-bends according to FIG. 2, but can also be designed in any other form, for example according to FIG. 3. A feeding of inerting gas is indicated only at one location with an arrow 53.

Figure 4:
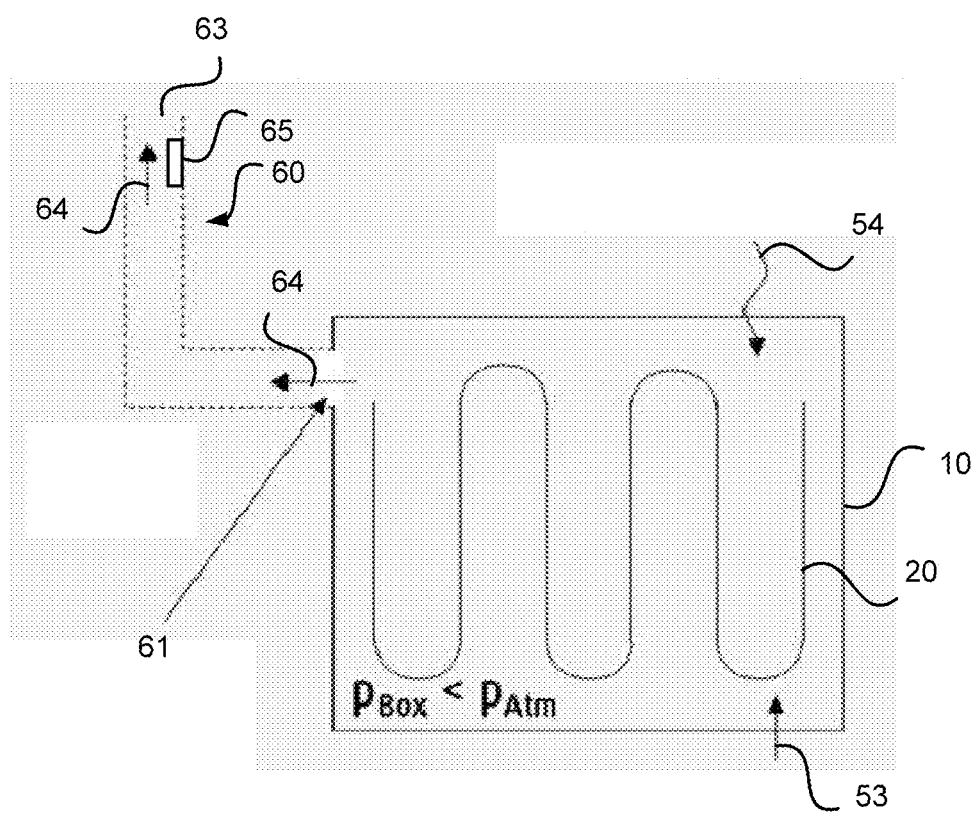

As illustrated in FIG. 4 with an arrow 54, false air can pass into the reactor vessel 10 via one or more false air inlets. In the embodiment illustrated here, the reactor vessel 10 has a permanently open discharge orifice 61 connected to the chimney 60. The inerting gas feed and the high temperatures in the reactor vessel 10 in relation to an end 63 of the chimney 60 result in a flow illustrated by arrows 64. In the reactor vessel, the high temperatures lead to a static pressure $p_{Box}$, which is below the atmospheric pressure $p_{Atm}$ in the adjacent surroundings when the inerting gas feed is carried out in an adapted manner. In other words, the amount of purge gas is not selected to be too large here. With a very large amount of purge gas, the pressure loss in the chimney 60 would lead to the internal pressure in the reactor vessel 10 approaching or even exceeding the external pressure.

In this embodiment with negative pressure in the reactor vessel, this amount prevents a return flow of ambient air into the reactor vessel 10 from occurring; low false air entries due to insufficient sealing are also compensated. The inerting gas supply into the reactor vessel 10 can in particular be regulated via an oxygen measurement 65 in the chimney 60, so that the oxygen content can be kept constant during operation.

Figure 5:
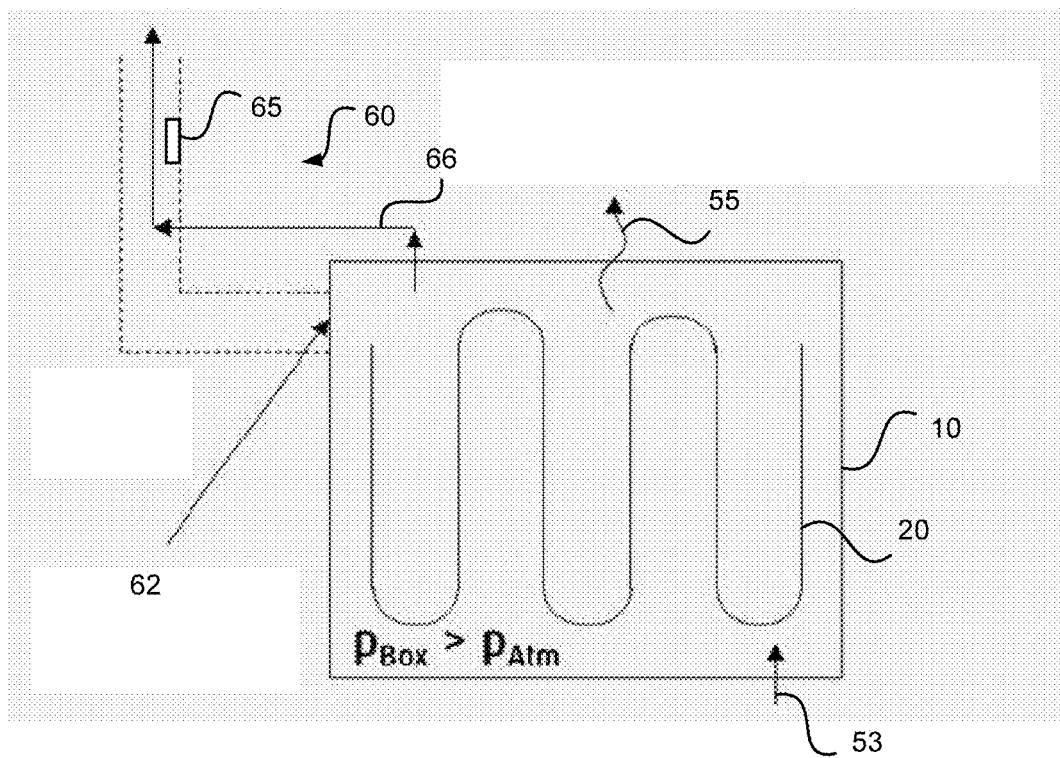

In contrast to the embodiment according to FIG. 4, the reactor vessel 10 according to FIG. 5 is operated at a superatmospheric pressure level, wherein inerting gas is continuously fed into the reactor vessel 10. The reactor vessel 10 has a discharge orifice 62, for example in the form of a bursting disk, which is set up to open above a preset pressure level.

In this alternative embodiment with pressurized operation, the inerting gas supply compensates low gas leakages into the atmosphere, which are illustrated here by an arrow 55. In this case, the purge quantity can be regulated via a pressure measurement in the reactor vessel 10. For continuous inerting gas purging, a correspondingly dimensioned outlet opening can be provided at a safe location (in the region of the chimney 60 or at another not easily accessible and non-hazardous location), so that a stream 66 from the reactor vessel 10 results.

Figure 6:
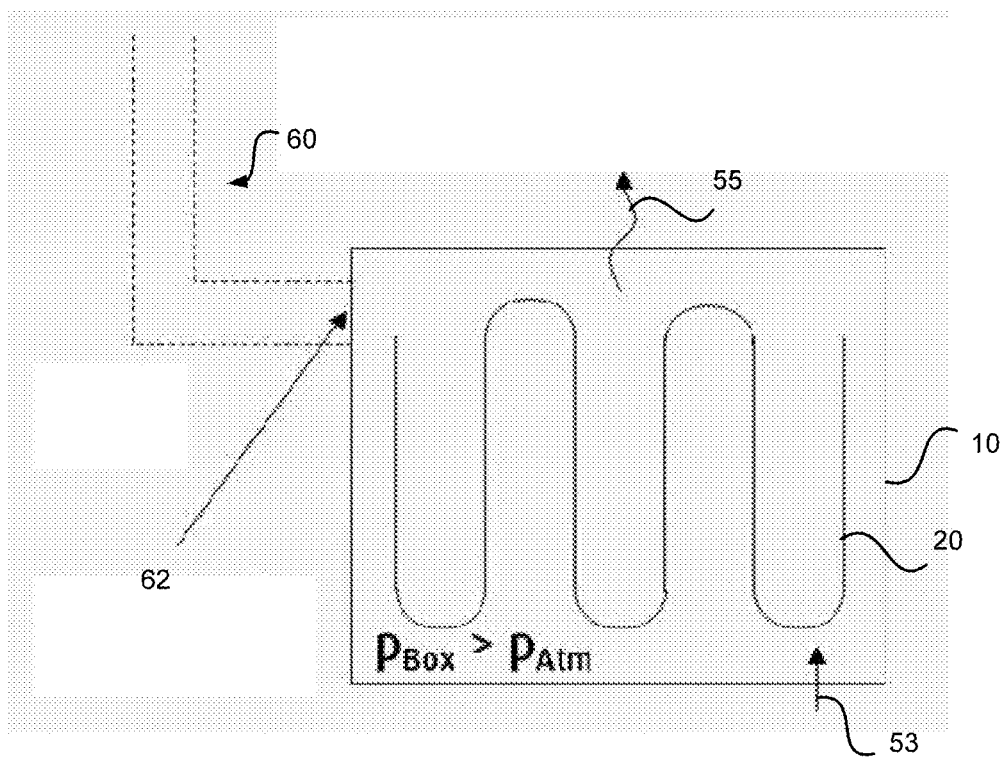

As in the embodiment according to FIG. 5, the reactor vessel 10 according to FIG. 6 is operated at a superatmospheric pressure level. Here as well, the reactor vessel 10 has a discharge orifice 62, for example in the form of a bursting disk, which is set up to open above a preset pressure level. However, a continuous throughflow of inerting gas is not provided, so that the stream 66 does not form in this embodiment.

In this alternative embodiment with pressurized operation, a purging for initial inertization is carried out, for example, only during operation preparation. During the further operation, only the equalization quantity of inerting gas for the leakage flows from the reactor vessel to the atmosphere is added continuously or in intervals. In this embodiment, there is thus no permanently open outlet for inerting gas to the atmosphere during normal operation.

In the embodiments according to FIGS. 4 to 6, operation of the reactor with hydrocarbons is advantageously only released when a required oxygen content is undershot.

In the embodiments according to FIGS. 4 and 5 with continuous purging, the oxygen content is preferably measured in the discharge of the purge gas downstream of the reactor vessel 10 (e.g., in the chimney 60 or another discharge line). Additionally or alternatively, the oxygen content can also be measured by means of suitable measuring methods (e.g., tunable diode laser, zirconium oxide probes, GC paramagnet) at one or more locations in the region of the reactor vessel 10. In the embodiment according to FIG. 6, the oxygen content can be measured analogously in a purge gas discharge line optionally used for the initial inertization and/or in the reactor vessel 10 itself. In addition, according to the embodiments according to FIGS. 5 and 6, the pressure within the reactor vessel can be continuously measured and monitored, in order to detect impermissible inerting gas loss early.

As indicated in more detailed drawings below, the chimney 60 in all previously illustrated embodiments can have structural elements (so-called velocity seals/confusor) in particular in the region of the chimney wall in order to avoid air return flows (e.g., due to free convection flows) back to the reactor vessel 20.

Figure 7:
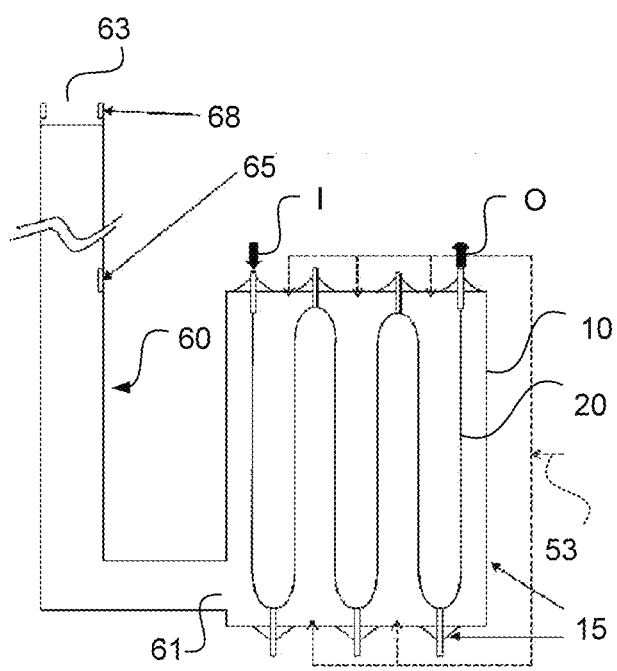

FIG. 7 schematically illustrates a reactor for carrying out a chemical reaction according to an embodiment of the invention in an extension with respect to the illustration according to the preceding figures, wherein elements already explained above are in part not illustrated again. For further explanation, reference is made in particular to the above FIG. 4.

As illustrated here, in the region of the chimney outlet 63, ignition devices or pilot burners 68 can additionally be installed in order to at least partially prevent the escape of uncombusted hydrocarbons into the atmosphere in the event of a disaster. As further illustrated, the inerting gas can be fed into the reactor vessel 10 at different sides. A wall of the reactor vessel 10 and wall passages of fastenings or power input devices, which can each advantageously be designed to be gas-tight, are denoted by 15. I and O denote a feed of process gas and a removal of the process gas from the reaction tube 20.

Figure 8:
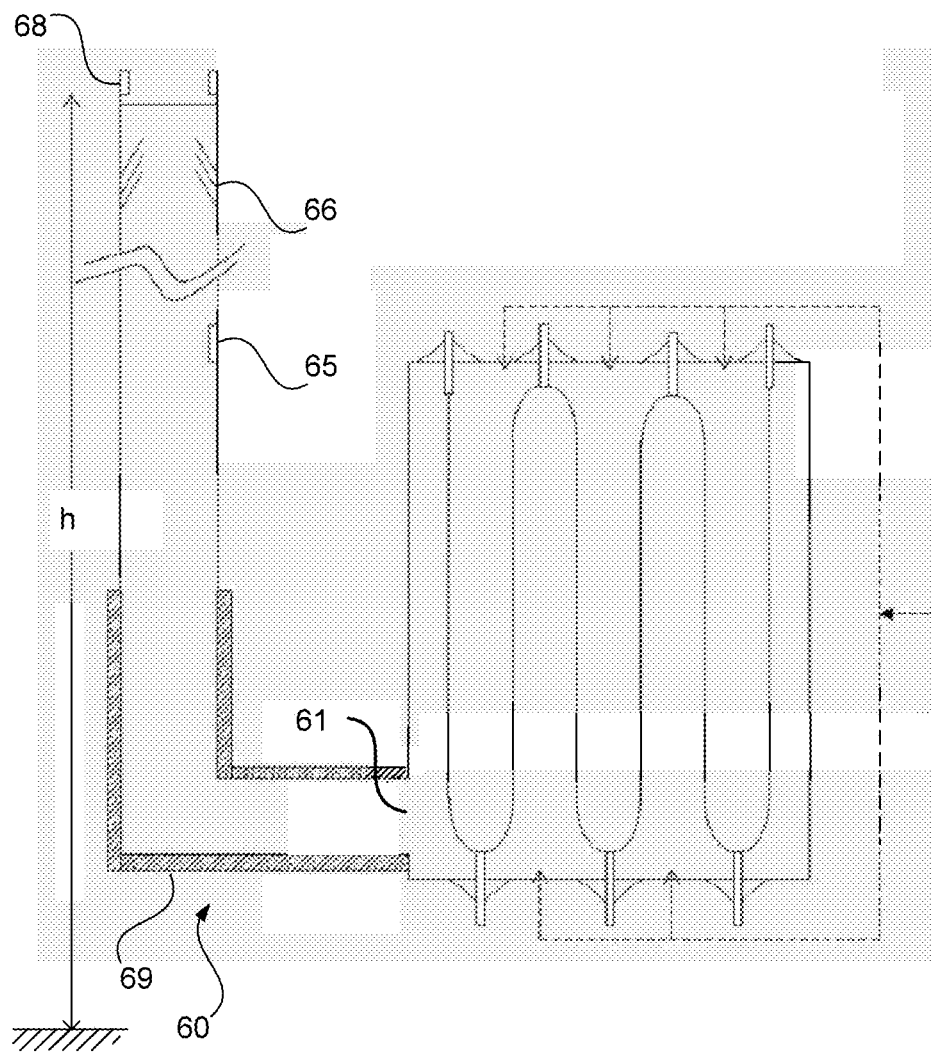

FIG. 8 schematically illustrates a reactor for carrying out a chemical reaction according to an embodiment of the invention in an extension to the representation according to FIG. 7 or a variant thereof. Components already explained with respect to FIG. 7 are partially not again provided with reference signs here.

As illustrated here, the chimney 60 can have a suitable insulation 69 in a region adjoining the reactor vessel 10. The chimney 70 can have a height h of, for example, 20 to 50 meters above ground. A so-called velocity seal 66 may be provided in the chimney 60.

Figure 9:
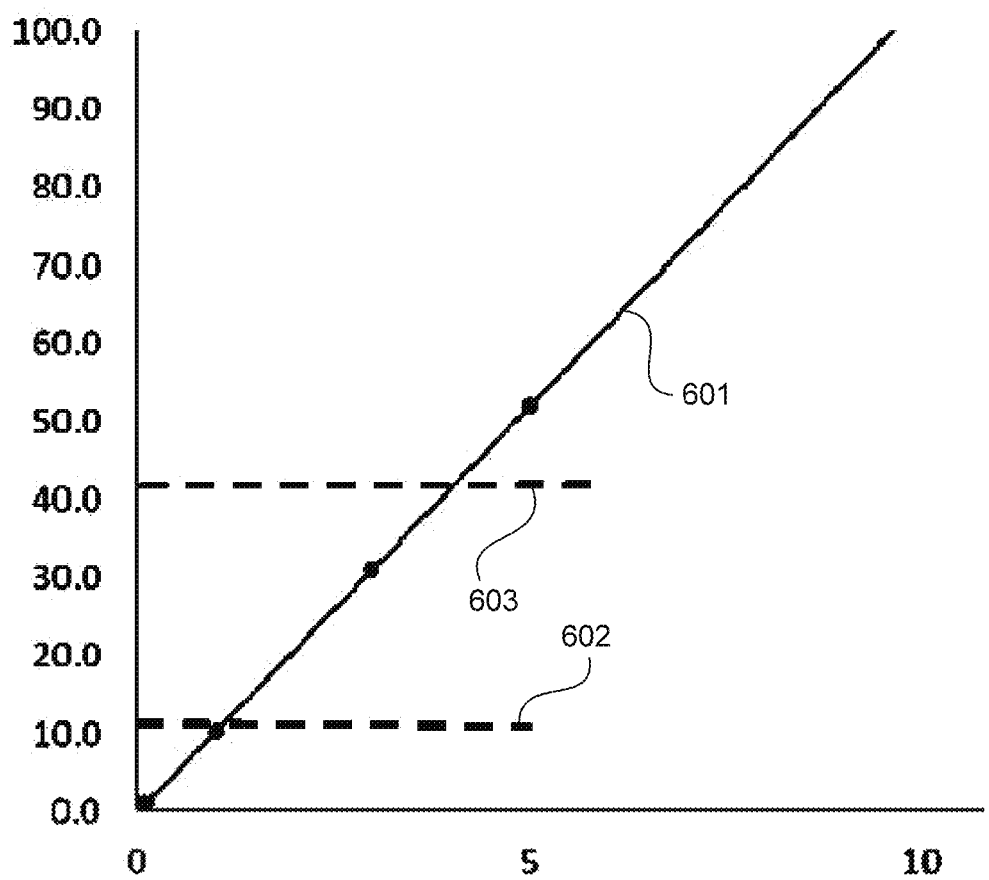
FIG. 9 schematically illustrates principles of dimensioning a chimney according to an embodiment of the invention.

FIG. 9 schematically illustrates the principles of chimney dimensioning according to an embodiment of the invention in the form of a diagram, in which an oxygen content in percent is plotted on the abscissa and a reaction-related volume increase rate in $m^3/s$ is plotted on the ordinate. A graph 601 represents the relationship already explained above with reference to the table. A dashed line 602 denotes values required for a maximum pressure increase of 20 mbar in the case of a chimney diameter of 500 mm; a dashed line 603 denotes corresponding values in the case of a chimney diameter of 900 mm.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurements provided herein are exemplary only and are not meant to specifically define the dimensions of the system.

The invention claimed is:

1. A reactor configured for steam cracking or steam reforming, comprising:
   a reactor vessel;
   reaction tubes; and
   means for the electrical heating of the reaction tubes;
   wherein:
      the reaction tubes are guided through the reactor with at least one U-bend or run through it without U-bends;
      the reactor vessel has one or more discharge orifices that are permanently open or are set up to open above a preset pressure level;
      gas feed means are provided and configured to feed an inerting gas into the reactor vessel and thereby charge an inner space of the reactor vessel with the inerting gas; and
      means are provided and configured to prevent reaction operation if an oxygen content and/or pressure and/or hydrocarbon content measured in the reactor vessel and/or in a discharge line downstream of the reactor vessel exceeds a respective preset value.

2. The reactor according to claim 1, which is set up to carry out the steam cracking or steam reforming at a temperature level of more than 500° C.

3. The reactor according to claim 1, wherein the one or more discharge orifices are permanently open.

4. The reactor according to claim 1, wherein the one or more discharge orifices are closed below the preset pressure level and are set up to open temporarily or permanently when the preset pressure level is reached.

5. The reactor according to claim 1, wherein the gas feed means are set up to continuously feed the inerting gas into the reactor vessel.

6. The reactor according to claim 1, wherein the gas feed means are set up to supply the inerting gas to the reactor vessel once or periodically.

7. The reactor according to claim 3, wherein the reactor vessel is set up for operation at a subatmospheric pressure level and has means for forming a gas flow from the reactor vessel.

8. The reactor according to claim 4, wherein the reactor vessel is set up for operation at a supercritical pressure level.

9. The reactor according to claim 1, wherein the gas feed means are set up to provide as the inerting gas a gas or a gas mixture which has nitrogen, carbon dioxide, and/or argon in a respectively superatmospheric content.

10. The reactor according to claim 1, wherein the one or more discharge orifices are connected to one or more chimneys.

11. The reactor according to claim 10, wherein the gas feed means are configured to adjust a maximum oxygen content in the reaction vessel on the basis of a dimensioning of the chimney(s).

12. The reactor according to claim 1, wherein the gas feed means are set up to regulate an amount of inerting gas on the basis of an oxygen measurement.

13. A method for steam cracking or steam reforming, comprising:
   providing a reactor comprising:
      a reactor vessel;
      reaction tubes; and
      means for the electrical heating of the reaction tubes;

wherein:
- the reaction tubes are guided through the reactor with at least one U-bend or run through it without U-bends;
- the reactor vessel has one or more discharge orifices which are permanently open or are set up to open above a preset pressure level;
- an inerting gas is fed into the reactor vessel by a gas feed means whereby an inner space of the reactor vessel is charged with the inerting gas; and
- means are provided and configured to prevent reaction operation if an oxygen content and/or a pressure and/or a hydrocarbon content measured in the reactor vessel and/or in a discharge line downstream of the reactor vessel exceeds a respective preset value; and
- operating the reactor to carry out said steam cracking or steam reforming.

14. The reactor according to claim 2, wherein the one or more discharge orifices are permanently open.

15. The reactor according to claim 2, wherein the one or more discharge orifices are closed below the preset pressure level and are set up to open temporarily or permanently when the preset pressure level is reached.

16. The reactor according to claim 15, wherein the gas feed means are set up to continuously feed the inerting gas into the reactor vessel.

17. The reactor according to claim 4, wherein the gas feed means are set up to continuously feed the inerting gas into the reactor vessel.

18. The reactor according to claim 4, wherein the gas feed means are set up to supply the inerting gas to the reactor vessel once or periodically.

19. The reactor according to claim 17, wherein the gas feed means are set up to provide as the inerting gas a gas or a gas mixture which has nitrogen, carbon dioxide, and/or argon in a respectively superatmospheric content.

20. The reactor according to claim 18, wherein the gas feed means are set up to provide as the inerting gas a gas or a gas mixture which has nitrogen, carbon dioxide, and/or argon in a respectively superatmospheric content.

* * * * *